3,432,751
APPARATUS FOR ORIENTING A TOTAL
FIELD MAGNETOMETER
Ensley A. Godby, Ralph C. Baker, and Murray W. Strome, Ottawa, Ontario, Canada, assignors to Canadian Patents and Development Limited, Ottawa, Ontario, Canada, a corporation of Canada
Filed Mar. 22, 1965, Ser. No. 441,588
U.S. Cl. 324—43                                    9 Claims
Int. Cl. G01r 33/02

ABSTRACT OF THE DISCLOSURE

Apparatus for orienting a single total field measuring magnetometer so that a predetermined optimum axis is aligned parallel to the earth's magnetic field. In order to maintain the optimum axis parallel to the earth's magnetic field, the magnetic field at the magnetometer is electrically rotated by means of two coils which are perpendicular to the optimum axis and to each other. Sinusoidal currents which may be either of the same frequency and displaced in phased quadrature or two sinusoidal currents of different frequencies are applied to the two coils. The signal from the magnetometer is then processed by a frequency sensitive phase sensitive detector and amplifiers to drive the servo system so that the magnetometer is aligned with the optimum axis parallel to the earth's field.

---

Figure 1:
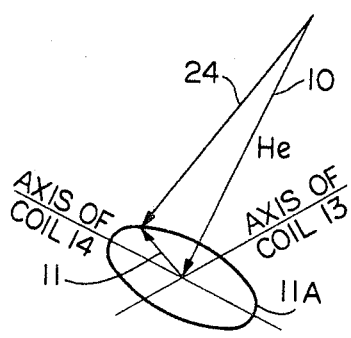

The present invention relates to apparatus for controlling the orientation of a total field magnetometer and is particularly concerned with the orientation of such a magnetometer when it is carried by an aircraft.

Magnetometers are commonly used for aerial geophysical exploration as well as the detection of magnetic anomalies. Up to the present time the majority of these magnetometers have been devices which were capable of measuring only the component of a magnetic field parallel to one axis of the magnetometer. Accordingly such magnetometers have required a mounting and orienting system which would compensate for all motions of an aircraft in which the magnetometer was flown. One proposal for compensating for misalignment of the magnetometer axis and component of the earth's magnetic field being detected has been to utilize an additional pair of magnetometers with their axes in a plane orthogonal to the axis of the magnetometer used for measuring the component of the earth's field. Any misalignment of the axis of the measuring magnetometer with the earth's field will result in a component of the earth's field being detected in the stabilizing magnetometers and providing an output signal to drive servo motors controlling mounting gimbals for the magnetometer array.

The present invention is concerned with a mounting and orienting apparatus for orienting a total field magnetometer of the type which measures not only the component of the earth's magnetic field parallel to a given axis of the magnetometer but the total field. The orienting system of the invention utilizes a novel principle for deriving signals to correct errors in the magnetometer orientation.

The optimum magnetic axis of a total field magnetometer is that axis which, when maintained parallel with the ambient field $H_e$, will in some way optimize the output of the magnetometer.

For the purposes of this invention an axis is chosen which provides maximum output signal level and minimum heading error noise. In general these two parameters are not both optimized by choosing a single axis; one is optimized for one axis, the other for a different axis. Accordingly a compromise axis would normally be chosen.

It is possible that magnetometers manufactured especially for a servo-oriented system would be designed to have a single "optimum axis."

In accordance with one form of the present invention a total field magnetometer is oriented by arranging a first coil with its axis perpendicular to the optimum magnetic axis of the total field magnetometer and a second coil with its axis mutually orthogonal to the axis of the total field magnetometer and the axis of the first coil. Means are provided to excite the first and second coils with an alternating current of predetermined constant frequency, the current supplied to one of the first and second coils being 90° out of phase with the current supplied to the other coil. Means are also provided for detecting alternating current components in the output of the total field magnetometer at said predetermined frequency and for controlling drive means for orienting the total field magnetometer so that no output is detected in the magnetometer at the said predetermined frequency.

Figure 2:
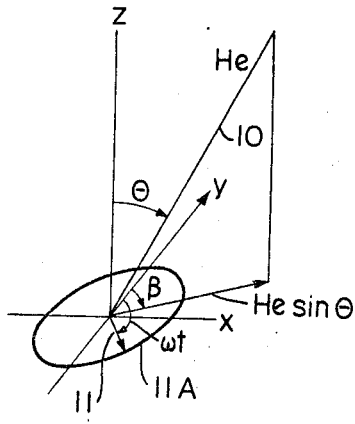
Figure 3:
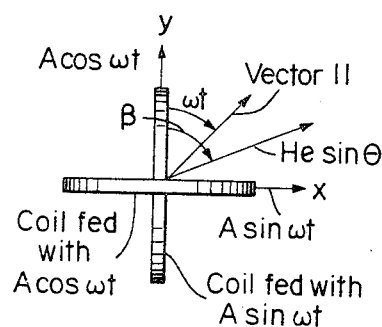
Figure 4:
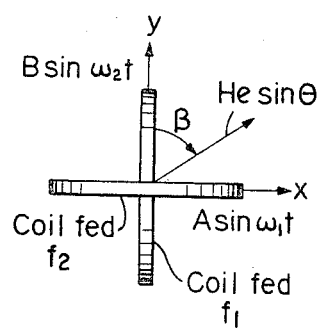
Figure 5:
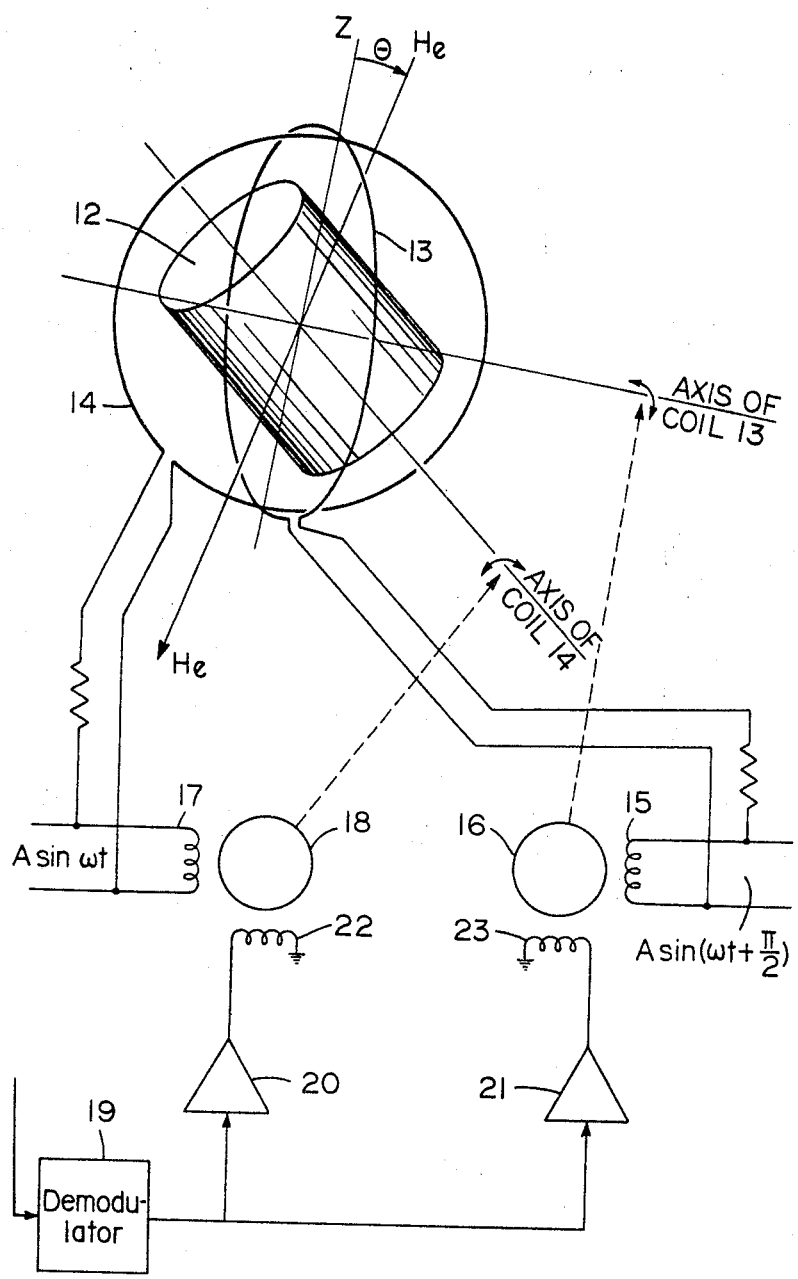

In drawings which illustrate the principle and an embodiment of the invention;

FIGURE 1 is a vector diagram showing the principle of the present invention,

FIGURE 2 is a vector diagram similar to FIGURE 1 with the magnetometer axis displaced from the axis of the earth's magnetic field by an angle $\theta$, FIGURE 3 is a plan view of the coils used to generate the rotating vector, FIGURE 4 is a plan view of the coils used in a two frequency system, and FIGURE 5 is a schematic diagram showing the structure and operation of a magnetometer orienting system constructed in accordance with the invention.

Referring to FIG. 1 vector 10 represents the total field vector $H_e$ of the earth's magnetic field. Vector 11 represents a rotating electrical vector which traces out the circular orbit 11A. The vector 11 is the resultant of two sinusoidal magnetic fields produced by coils 13 and 14 having axes Y and X respectively which are at right angles to one another and which are 90° out of phase and rotates at a rotation rate $\omega$, where $\omega$ is related to the frequency of the alternating magnetic fields by the relationship of $f=\omega/2\pi$. So long as the plane of the orbit 11A of the vector 11 is orthogonal to the vector 10, then the resultant vector 24 detected by the magnetometer is of constant length. If, however, the plane of the orbit 11A is not orthogonal to the vector 10, then the resultant vector 24 will include a component varying at the frequency $f$. The variation in the resultant vector 24 may be detected and used as a signal to control the orientation of the magnetometer so that the plane of the orbit 11A will return to its proper position orthogonal to the vector 10.

In FIGURE 2 the axis of the coil 13 is not perpendicular with the vector 10 and the plane of the orbit 11A is not perpendicular to the vector 10. The angle $\theta$ is the misalignment angle between the vector 10 and the Z axis which is perpendicular to the plane of the orbit 11A.

In FIGURE 3 the orbit 11A of the vector 11 is in the plane of the paper and the axis labelled as Z in FIGURE 2 is perpendicular to the plane of the paper in FIGURE 3. It will be appreciated that the resultant of the vector 10 and the rotating vector 11 will not be of constant magnitude, but will have a component which varies sinusoidally at the frequency $f$. Referring to the angles and magnitudes illustrated in FIGURES 2 and 3, the total field detected by the magnometer is $$H = i[A \sin \omega t + H_e \sin \theta \sin \beta]$$
$$+ j[A \cos \omega t + H_e \sin \theta \cos \beta] + k[H_e \cos \theta]$$

The angle $\theta$ is the misalignment angle of the earth's magnetic field and the Z axis which is orthogonal to the plane of the orbit 11A, the angle $\beta$ is the angle between the component of $H_e$ lying in the XY plane and the Y axis, and $i$, $j$ and $k$ are unit vectors in the direction of the X, Y and Z axes respectively. From this the magnitude of the magnetic field H can be shown to be $$H^2 = A^2 + H_e^2 \sin^2 \theta + 2AH_e \sin \theta [\sin \omega t \sin \beta + \cos \omega t \cos \beta] + H_e^2 \cos^2 \theta$$

and hence $$H^2 = A^2 + H_e^2 + 2AH_e \sin \theta [\cos (\omega t - \beta)]$$

FIGURE 4 is a figure similar to FIGURE 3 illustrating further alternatives of the invention in which different frequencies are applied to the two coils, one coil being fed with a signal of frequency $f_1$ and the other coil being fed with a frequency $f_2$. Hence a field is generated in the direction of the X axis which may be represented by the expression $A \sin \omega_1 t$ and a field is generated in the direction of Y axis of $B \sin \omega_2 t$, then the total field detected by the magnetometer will be $$H = i(A \sin \omega_1 t + H_e \sin \theta \sin \beta) + j(B \sin \omega_2 t + H_e \sin \theta \cos \beta) + kH_e \cos \theta$$

Accordingly the square of the magnitude of the magnetometer field is:

$$H^2 = H_e^2 + A^2 \sin^2 \omega_1 t + B^2 \sin^2 \omega_2 t + 2H_e A \sin \theta \sin \beta \sin \omega_1 t + 2H_e B \sin \theta \cos \beta \sin \omega_2 t$$

If we consider a misalignment along one axis only, that is let angle $\beta = \pi/2$ or 90° and we let $A = B$ then the magnitude of the field may be represented by the equation $$H^2 = (H_e^2 + A^2) - A^2/2 [\cos 2\omega_1 t + \cos 2\omega_2 t] + 2H_e A \sin \theta \sin \omega_1 t$$

The first expression in this equation is a constant term, the second expression is a second harmonic term and the final expression in the equation is a fundamental term which depends on the misalignment angle $\theta$. Accordingly it is clear that a signal may be derived using either a single frequency with phase displacement or using two frequencies which signal may be used to correct for misalignment errors in the magnetometer.

Apparatus for orientating a magnetometer based on the principle of operation illustrated in FIGURES 1, 2 and 3 is shown in FIGURE 5. As before the vector 10 represents the total field vector of the earth's magnetic field $H_e$. The cylinder 12 represents the total field magnetometer, 13 is one of the coils which is used to generate the rotating magnetic field vector 11 of FIGURE 1, and 14 is the other coil of the two coil system for generating the other component of the vector 11 of FIGURE 1. The coils 13 and 14 are excited by electrical currents, the coil 13 being driven by a current which may be represented by the expression $A \sin (\omega t + \pi/2)$ and the coil 14 is driven by a current $A \sin \omega t$. Thus the two currents driving the coils 13 and 14 are 90° out of phase and the magnetic fields induced by these currents in the coils 13 and 14 are similarly 90° out of phase. The resultant field from the two coils 13 and 14 may be represented by a rotating vector shown as numeral 11 on FIGURE 1 which rotates about an axis fixed in relation to the total field magnetometer 12. Since the coils 13 and 14 are fixed in relation to the magnetometer 12, when the optimum axis of the magnetometer is misaligned with the earth's magnetic field $H_e$, the plane of rotation of the vector 11 is no longer orthogonal to the plane of the earth's magnetic field and a component of frequency $f = \omega/2\pi$ is detected by the total field magnetometer. The amplitude of this component is proportional to the amount by which the total field vector of the earth's magnetic field is displaced from a position orthogonal to the plane of the vector 11, and the phase of the signal is determined by the angular position of the component of $H_e$ lying in the plane of rotation of vector 11.

The voltage applied to coil 13 is also applied to a winding 15 of a servo motor 16 which is connected to drive one of a pair of gimbals (not shown) of a magnetometer mounting system. Similarly the voltage applied to the coil 14 is also applied to a winding 17 of a servo motor 18 connected to drive the other gimbal (not shown) of the magnetometer mounting system. A signal detected in a magnetometer coil is fed to a demodulator 19 and then to the amplifiers 20 and 21, and to the coils 22 and 23 and from the amplifiers 20 and 21 respectively of the servo motors 18 and 16 respectively. The signal is thus demodulated in the demodulator 19, amplified by the amplifiers 20 and 21 and fed to the coils 22 and 23. The presence of a field sin $(\omega t + \pi/2)$ in coil 22 causes the servo motor 18 to rotate and to rotate the magnetometer 12 in a direction tending to reduce the sin $(\omega t + \pi/2)$ signal to zero. Similarly a field sin $\omega t$ in coil 23 causes the servo motor 16 to rotate the magnetometer 12 so that the sin $\omega t$ signal is reduced to zero. When no signals are detected in the windings 22 and 23, the magnetometer 12 is correctly aligned by the orienting system with the total field vector of the earth's magnetic field and remains in this position until a change in orientation of a vehicle carrying the magnetometer 12 or other reason causes a signal to be induced in the magnetometer 12 to drive it back to alignment with the total field vector of the earth's magnetic field.

It will be appreciated that the servo motors 16 and 18 are merely one means of utilizing the error signals derived from the demodulator 19 and that other means may be substituted for controlling the orientation of the total field magnetometer in response to a signal component in its output derived from the magnetic fields generated by the orthogonal coils 13 and 14.

It will also be appreciated that the invention is not limited to any specific form of total field magnetometer, however a magnetometer suitable for use with the present invention is the Rubidium vapor magnetometer such as described in data sheet X–4936 issued by Varian Associates, 611 Hansen Parkway, Palo Alto, Calif., U.S.A.

The coils 13 and 14 can be fed by two discrete frequencies $f_1$ and $f_2$. These two frequencies can be detected and the resultant of one used to drive one servo motor and the resultant of the other used to drive the second servo motor. Thus $A \sin \omega t$ would be replaced by $A \sin \omega_1 t$ and $A \sin (\omega t + \pi/2)$ would be replaced by $A \sin \omega_2 t$. Amplifier 20 would include a filter to select $f_1$ and amplifier 21 would include a filter to select $f_2$. When the magnetometer 12 is correctly aligned frequencies of $2f_1$ and $2f_2$ would be detected. If misaligned along a first axis a foundamental frequency $f_1$ would appear, if misaligned along a second axis a frequency $f_2$ would appear.

We claim:

1. Apparatus for orienting a total field magnetometer to maintain a predetermined optimum axis aligned parallel to the earth's magnetic field comprising a first coil with its axis perpendicular to said optimum magnetic axis of the total field magnetometer, a second coil with its axis mutually orthogonal to said optimum axis and the axis of said first coil, said coils being magnetically coupled to the total field magnetometer, means connected to said coils to cause alternating currents of predetermined constant frequencies to flow in said first and second coils, and means connected to the magnetometer to detect alternating current components at said predetermined constant frequencies due to the alternating currents in said coils in the output of the total field magnetometer and for generating signals to control drive means connected to the magnetometer for orienting the total field magnetometer so that substantially no alternating current output is detected from the magnetometer at said predetermined frequencies.

2. Apparatus for orienting a total field magnetometer to maintain a predetermined optimum axis aligned parallel to the earth's magnetic field comprising a first coil with its axis perpendicular to said optimum magnetic axis of the total field magnetometer, a second coil with its axis mutually orthogonal to said optimum axis of the total field magnetometer and the axis of the first coil, said coils being magnetically coupled to the total field magnetometer, means connected to said coils to excite the first and second coils with an alternating current of predetermined constant frequency, the current supplied to one of the first and second coils being 90° out of phase with the current supplied to the other of said first and second coils, means connected to said magnetometer to detect alternating current components in the output of the total field magnetometer at said frequency and for generating signals to control drive means connected to said magnetometer for orienting the total field magnetometer so that no output is detected from the magnetometer at said predetermined frequency.

3. Apparatus for orienting a total field magnetometer to maintain a predetermined optimum axis aligned parallel to the earth's magnetic field comprising a first coil with its axis perpendicular to said optimum magnetic axis of the total field magnetometer, a second coil with its axis mutually orthogonal to said optimum axis of the total field magnetometer and the axis of the first coil, said coils being magnetically coupled to the total field magnetometer, means connected to the first coil to excite the first coil with an alternating current of predetermined constant frequency, means connected to the second coil to excite the second coil with an alternating current of a second predetermined constant frequency, said second frequency being different from said first frequency, means connected to the magnetometer to detect alternating current components at said first and second frequencies due to the currents in said coils in the output of the total field magnetometer, and for generating signals dependent on the alternating current components to control drive means connected to the magnetometer for orienting the total field magnetometer so that no output is detected from the magnetometer at said predetermined frequencies.

4. Apparatus according to claim 1 wherein said means connected to the magnetometer to detect alternating current components and for generating signals to control drive means connected to the magnetometer comprises, a demodulator to which the output of said magnetometer is applied, a first amplifier connected to the demodulator selectively to amplify alternating components due to alternating currents applied to said first coil, and a second amplifier connected to the demodulator selectively to amplify alternating components due to alternating currents applied to said second coil.

5. Apparatus according to claim 2 wherein said means connected to the magnetometer to detect alternating current components and for generating signals to control drive means connected to the magnetometer comprises, a demodulator to which the output of said magnetometer is applied, a first amplifier connected to the demodulator selectively to amplify alternating components due to alternating currents applied to said first coil, and a second amplifier connected to the demodulator selectively to amplify alternating components due to alternating currents applied to said second coil.

6. Apparatus according to claim 3 wherein said means connected to the magnetometer detect alternating current components and for generating signals to control drive means connected to the magnetometer comprises, a demodulator to which the output of said magnetometer is applied, a first amplifier connected to the demodulator selectively to amplify alternating components due to alternating currents applied to said first coil, and a second amplifier connected to the demodulator selectively to amplify alternating components due to alternating currents applied to said second coil.

7. Apparatus according to claim 4 wherein the alternating current supplied to said first coil is simultaneously supplied to one winding of a servo motor of the drive means, and the output of said first amplifier is applied to another winding of said servo motor, and the alternating current supplied to said second coil is also supplied to one winding of a second servo motor of the drive means, and the output of said second amplifier is supplied to another winding of said second servo motor.

8. Apparatus according to claim 5 wherein the alternating current applied to said first coil is simultaneously applied to one winding of a servo motor of the drive means, and the output of said first amplifier is applied to another winding of said servo motor, and the alternating current supplied to said second coil is also supplied to one winding of a second servo motor of the drive means and the output of said second amplifier is supplied to another winding of said second servo motor.

9. Apparatus according to claim 6 wherein the alternating current applied to said first coil is simultaneously applied to one winding of a servo motor of the drive means, and the output of said first amplifier is applied to another winding of said servo motor and the alternating current applied to said second coil is also applied to one winding of a second servo motor of the drive means and the output of said second amplifier is applied to another coil of said second servo motor.

References Cited

UNITED STATES PATENTS 2,886,773   5/1959   Potosky et al. _____ 324—43

RUDOLPH V. ROLINEC, *Primary Examiner.*

R. J. CORCORAN, *Assistant Examiner.*